July 16, 1929.  G. D. ANGLE  1,720,711
METHOD OF MAKING CYLINDER HEADS
Filed June 9, 1923   2 Sheets-Sheet 1

INVENTOR
GLENN D. ANGLE
BY Robert H. Young
ATTORNEY

July 16, 1929.　　　　G. D. ANGLE　　　　1,720,711
METHOD OF MAKING CYLINDER HEADS
Filed June 9, 1923　　　2 Sheets-Sheet 2
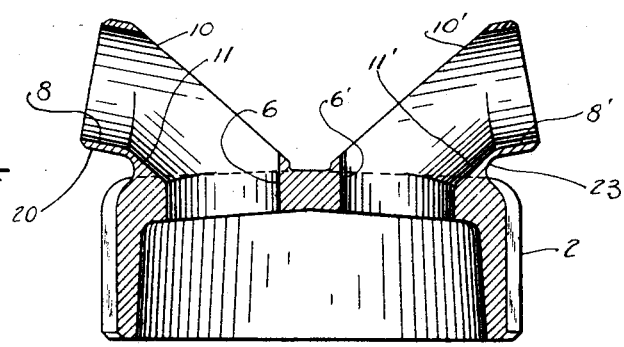
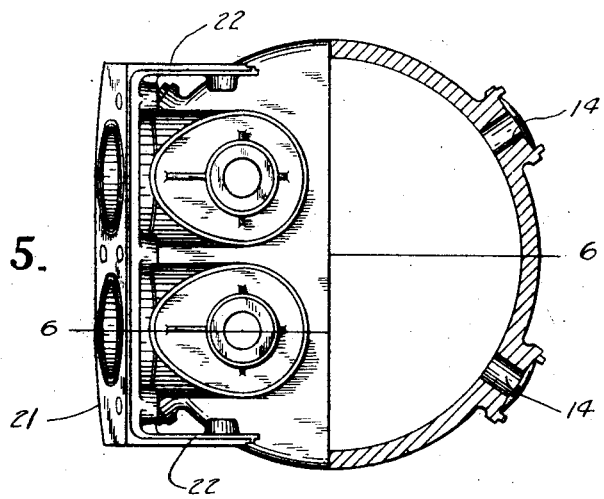
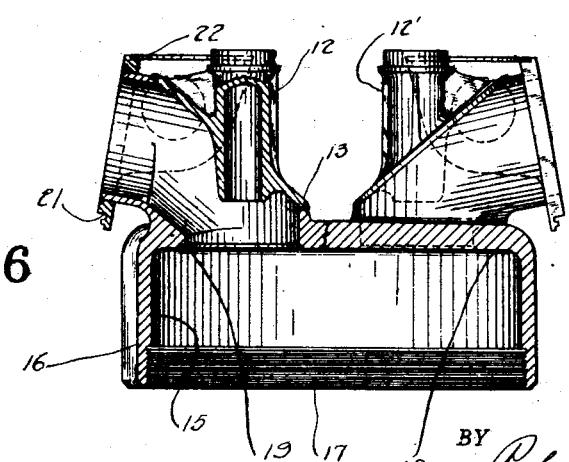
INVENTOR
GLENN D. ANGLE
BY Robert H. Young
ATTORNEY Patented July 16, 1929.

1,720,711

UNITED STATES PATENT OFFICE.

GLENN D. ANGLE, OF DAYTON, OHIO.

METHOD OF MAKING CYLINDER HEADS.

Application filed June 9, 1923. Serial No. 644,490.

This invention relates to the manufacture of cylinder heads for internal combustion engines. Heretofore in the manufacture of steel cylinder heads the entire valve ports have been welded or otherwise secured to the cylinder head. Many difficulties such as warping and distortion have been experienced in the process of welding with the result that the centers of the work have been buckled out of line thereby necessitating the work to be realigned and remachined. In the case of making the valve ports separate and securing them to the cylinder head by threaded portions, many difficulties have been experienced due to poor joints between the body of the valve ports and the cylinder head proper. The new method to be hereinafter described, obviates all these difficulties. In actual construction it has been found that with my improved method the cost of production could be lessened about twenty-five percent. Heretofore it has been practically impossible to make a drop forged cylinder head on account of its design and construction, but by the welding process to be hereinafter described such construction will be quite practical.

The main object of this invention is the production of an internal combustion engine cylinder head as a forging with the valve ports formed integral therewith.

Further objects of this invention will become apparent in the description and claims of the invention. To more fully comprehend the invention, reference is directed to the accompanying drawings and description wherein:—

Fig. 4 is a vertical section taken on the line 4—4 of Fig. 3.

Fig. 5 is a top plan view, partly in section, after the machining is finished and the valve guide bosses welded in place.

Fig. 6 is a vertical section taken on the irregular line 6—6 of Fig. 5.

In internal combustion engines it is common practice to make the engine head as a separate unit and join it to the cylinder; the method to be now set forth enables the engine head to be made by the drop forging or die casting process, the valve ports being made integral with the head proper. It is impossible to make the entire cylinder head as a single drop forging due to the peculiar shape of the valve ports, but a plurality of drop forgings may be made and welded together and properly machined, or a single drop forging may be made and then machined to properly shape the forging. The method of making a plurality of complementary parts to be welded together to form an engine cylinder head will first be described.

Figure 1:
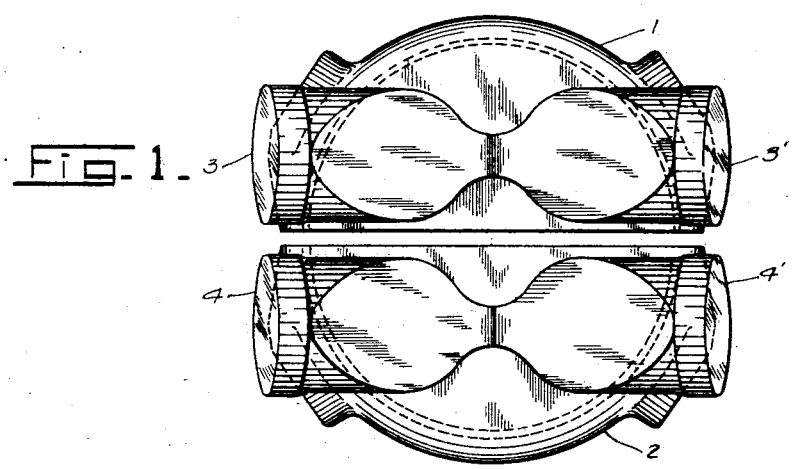
Fig. 1 is a top plan view of the cylinder head forgings before being welded together where the head is made of two complementary sections welded together.
Figure 2:
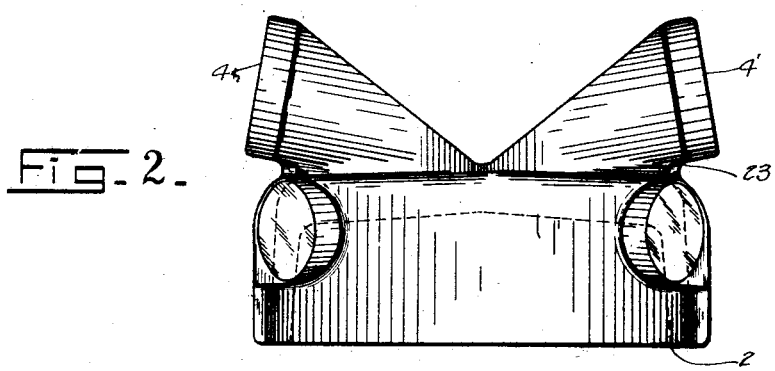
Fig. 2 is a side elevation of one of the forgings of Fig. 1.
Figure 3:
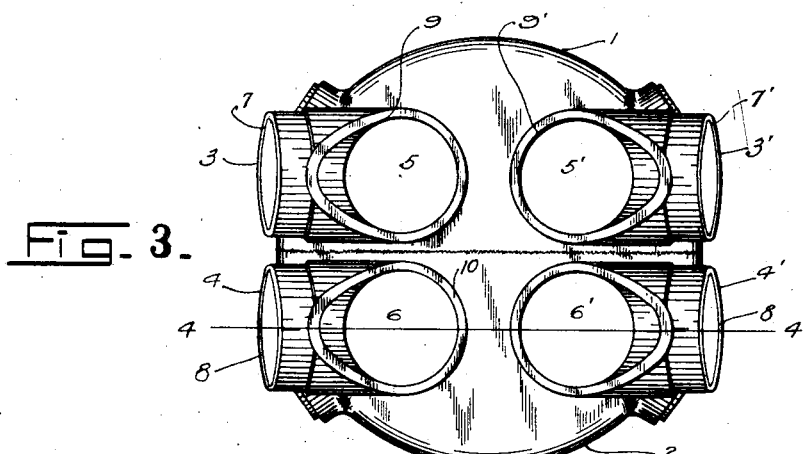
Fig. 3 is a top plan view of the two forgings after being welded together and partly machined.

Each of the separately formed drop forgings 1, 2, of the cylinder head, are of suitable shape as shown in Figs. 1 and 2, as to form complementary halves of a mass of suitable metal, such as steel from which a cylinder head may be machined. The forging 1 is provided with the solid masses of metal 3, and 3' and the half 2 is provided with the masses 4, 4' which are later machined, and provided with the valve guide bosses to form the valve ports, the finished cylinder head being provided with two intake and two exhaust valves. After the drop forgings 1 and 2 have been made they are welded together along their adjacent edges so as to be formed into a solid unit as shown in Fig. 3. As the thickness of the metal along this welded joint is considerable, the parts 1 and 2 will retain their shape and will not be warped by the heat generated in the welding operation.

The joined halves are now ready to be machined. The first machining operation is the drilling of the holes 5, 5', 6, 6' preferably from the bottom outwardly, and the holes 7, 7', 8, 8' are then drilled.

The sloping surfaces 9, 9', 10, 10' of the valve ports are machined to be perfectly flat and at the proper angle, and the curved surfaces 11, 11' inside of the valve passages are finished to remove the surplus material left by the drilling of the holes mentioned. Valve guide bosses 12, 12' are separately made and are each provided with a flange 13 and the flanges of the valve guide bosses are welded to the sloping surfaces 9, 9', 10, 10'. Very little or no distortion takes place in this operation as no great amount of heat is used and as the cylinder head will absorb a great amount of heat due to its thickness. The spark plug openings 14, interior and exterior surfaces 15 and 16, screw threads 17, upper inside surface 18, valve seats 19 and valve port flange seats 20 may all be machined as may be found most convenient either before or after the valve guide bosses are welded in place. The valve port jackets or flange plates 21 are welded to the valve ports and are held in place by reinforcing strips 22.

Instead of constructing the cylinder head of two similar drop forgings and welding them together as just described, a single integral drop forging may be made in which the metal remains between the ends of the valve ports and the end of the cylinder head. This is then cut away as at 23 in the machining operations and the same proceeding followed as described for the welded cylinder head made in halves as hereinbefore described.

Having thus described my invention, I claim:

1. The method of making a cylinder head consisting in making a drop forged cylinder head block provided with integral valve port projections, finishing an inside passage in each valve port projection, finishing a sloping surface on each valve port projection, and joining a valve guide member to each finished sloping surface.

2. The method of making a cylinder head consisting in making a drop forged cylinder head block provided with a plurality of integral valve port projections, finishing an inside passage on each valve port projection, finishing an inwardly and downwardly extending sloping surface on each said projection, welding a valve guide member to each said sloping surface, and machining finished surfaces on the cylinder head thus made.

3. The method of forging a cylinder head consisting in making a plurality of homogeneous masses similar in shape and provided with integral valve port projections, securing the same together to collectively form a cylinder head and finishing the surfaces thereof.

4. The method of making a cylinder head, consisting in making a plurality of homogeneous masses, similar in shape securing the same together to collectively form a cylinder head with the valve ports of said cylinder head made integral therewith, finishing angularly extending surfaces of said valve ports to properly seat valve guide bosses, and joining valve guide bosses to said surfaces.

5. The method of making a cylinder head consisting in making a plurality of homogeneous masses similar in shape, welding the same together to collectively form a cylinder head with the valve ports made integral with said cylinder head, drilling and machining to proper dimensions the surfaces of said valve ports, and welding a valve guide boss to each valve port.

6. The method of making a cylinder head comprising making a plurality of drop forgings, welding the same together to collectively form a cylinder head with the valve ports made an integral part thereof finishing a plane sloping surface on each valve port and welding a valve guide boss to the finished angular surfaces of each valve port.

7. The method of making a four valved cylinder head comprising making a plurality of drop forgings similar in design and construction, welding the same together to collectively form a four valved cylinder head with valve ports a part thereof, machining finished surfaces on said four valved cylinder head and welding a valve guide boss to each valve port.

8. The method of making a cylinder head comprising making a plurality of drop forgings similar in design and construction, welding the same together to collectively form a cylinder head with valve ports a part thereof, machining the inside of said valve ports, machining finished angularly extending surfaces on said valve ports, welding a valve guide boss on each angularly extending surface, machining other finished surfaces on said cylinder head, and welding valve port flanges to said valve ports.

In testimony whereof I affix my signature.

GLENN D. ANGLE.